United States Patent [19]

Hunt

[11] Patent Number: 4,979,851
[45] Date of Patent: Dec. 25, 1990

[54] GROOVING OR THREADING TOOL

[75] Inventor: Carl E. Hunt, Davisburg, Mich.

[73] Assignee: GTE Valenite Corporation, Troy, Mich.

[21] Appl. No.: 527,679

[22] Filed: May 24, 1990

Related U.S. Application Data

[63] Continuation of Ser. No. 261,194, Oct. 24, 1988, abandoned.

[51] Int. Cl.$^5$ .............................................. B23B 27/00
[52] U.S. Cl. ...................................... 408/143; 82/904; 407/46; 408/144; 408/233; 408/239 R
[58] Field of Search ............... 408/141, 143, 144, 199, 408/200, 231, 233, 238, 239 R, 713, 239 A; 82/904; 407/46

[56] References Cited

U.S. PATENT DOCUMENTS

| | | |
|---|---|---|
| 3,164,041 | 1/1965 | Carlstedt . |
| 3,250,154 | 5/1966 | Breuning ............................. 408/199 |
| 3,375,741 | 4/1968 | Guglielmetti . |
| 3,447,402 | 6/1969 | Ray . |
| 3,820,422 | 6/1974 | Rivin ........................................ 82/36 |
| 3,923,414 | 12/1975 | Hopkins ............................. 408/143 |
| 3,938,626 | 2/1976 | Hopkins ................................... 188/1 |

FOREIGN PATENT DOCUMENTS 3237128 4/1984 Fed. Rep. of Germany .

OTHER PUBLICATIONS

"A Chatter-Resistant Cantilever Boring Bar", by Eugene I. Rivin, Wayne State Univ.
"An Extra-Long Cantilever Boring Bar with Enhanced Chatter Resistance", by Eugene I. Rivin and Xiap-Zhong Wu Wayne State Univ.

*Primary Examiner*—Daniel W. Howell
*Attorney, Agent, or Firm*—Robert E. Walter

[57] ABSTRACT

An elongated grooving or threading tool has a cutting section, an intermediate section including a devibrator body, and a rearward cemented carbide section which are, respectively, held together in axial alignment by a drawbolt which engages the cutting section and cemented carbide section for holding the intermediate section under compression.

2 Claims, 2 Drawing Sheets

GROOVING OR THREADING TOOL

CROSS REFERENCE TO RELATED APPLICATIONS

This is a continuation of copending application Ser. No. 07/261,194, filed on Oct. 24, 1988 now abandoned.

Copending application, U.S. Ser. No. 07/132,086, filed Dec. 11, 1987, entitled VIBRATION DAMPENED BORING BAR, by C. E. Hunt, relates to cantilever tools having a structure for dampening vibrations, and two additional applications both entitled Grooving or Threading Tool, by C. E. Hunt, having Ser. Nos. 07/261,509 and 07/262,762 are filed concurrently herewith.

FIELD OF INVENTION

The present invention relates to grooving or threading tools of the type having a longitudinal axis and a radially projecting cutting edge for grooving or threading applications.

BACKGROUND OF THE INVENTION

To accurately groove or thread small diameter cylindrical parts such as bars, tubes or pipes on either the inside or outside, it is often desirable to utilize an elongated tool. Such tools typically have a radially projecting cutting edge corresponding to the desired size of the groove or thread. Generally the part being grooved or threaded is rotated and, even axially moved for threading applications, while the cutting edge removes material. However, such tools may be rotated along the longitudinal axis for some cutting applications.

For some applications it is desirable to use a tool with a small diameter, so the tool can easily fit into the interior of a small diameter cylindrical opening. Due to the demands of industry for increased accuracy, it is desirable that the tool retain its rigidity and dimensional accuracy even when threading openings that extend deeply into the material being grooved or threaded. Due to the demands of industry for increased efficiency, it is desirable that the tool retain its sharpness and be capable of multiple operations for various sizes of grooves and threads. The present practice of reshaping and reshaping tools is time consuming and hence uneconomical.

The present invention concerns the production of an optimized grooving or threading tool constructed of materials which contribute to prolong tool life and are structurally combined in such a manner so as to permit grooving or threading with enhanced dimensional accuracy.

SUMMARY OF THE INVENTION

It is an object of the present invention to provide a grooving or threading tool with increased rigidity at the cutting section for enhancing the accuracy of machining operations.

It is an object of the present invention to provide a grooving or threading tool in which damaged parts can be readily disassembled and replaced.

It is a further object of the present invention to select materials which provide prolonged life and enhanced dimensional accuracy for a grooving or threading tool.

It is an object of the present invention to provide a grooving or threading tool utilizing a combination of different materials having an improved connection therebetween.

It is an object of the present invention to increase the stiffness of the joint at the transition of the different materials being utilized.

It is an object of the present invention to provide for a selection of materials in combination with a joint configuration which results in minimizing the transition of the flexure characteristics along the axial length of the grooving or threading tool.

It is a further object of the present invention to select materials which prolonged the life and enhance the vibration resistance of grooving or threading tool.

It is an object of the present invention to provide for a higher natural frequency of oscillations by improving the joint between the different materials and the overall construction of the boring bar.

Additional and further objects of the present invention will become apparent from reading the following description of the present invention.

In accordance with the present invention, there is provided an elongated grooving or threading tool of the type having a radially projecting cutting edge. The tool comprises a cutting section having an axially extending bore and a radially projecting cutting edge, a hollow cylindrically shaped cemented carbide section, and a hollow cylindrically shaped intermediate steel section. A drawbar which is connected between the cutting section and the cemented carbide section holds these sections in axial alignment along the central axis. The drawbar, which is under tension, holds the intermediate section and the respective joints between the sections under compression for increasing the stiffness of the tool at the joints. The drawbar includes means for centering said drawbar relative to the rearward section for preventing relative radial movement between the forward end of the drawbar and the rearward cemented carbide section.

The intermediate section is provided with a devibrator body preferable in the form of at least one annular ring for dampening vibration. The annular ring which is positioned radially intermediate the drawbar and the inside surface of the bore in intermediate section is positioned axially intermediate the head section and the carbide section. The intermediate section forms a first connection with the head section and a second connection with the cemented carbide section.

Each connection comprises a key and a keyway and additionally a pair of first and second surfaces. The first surfaces and second surfaces respectively, extend on either side of the respective key or keyway and lie substantially within a plane perpendicular to the axis of rotation. The first surfaces are adapted to mate with the second surfaces for maintained axial alignment of the respective sections and along the axis of rotation and increasing the stiffness of the joint.

The connection has a specific configuration adapted for joining the hollow cemented carbide section and the cutting section to the intermediate section. In addition to comprising a drawbar for holding the respective sections under compression for increasing the stiffness of the tool at the joints, the connection includes a key and a keyway and an additional pair of mating surfaces as set forth above. Preferably, the first and second surfaces of the respective cutting section or the cemented carbide section comprise a major portion of the cross-sectional area of the respective section.

DESCRIPTION OF PREFERRED EMBODIMENT

Figure 1:
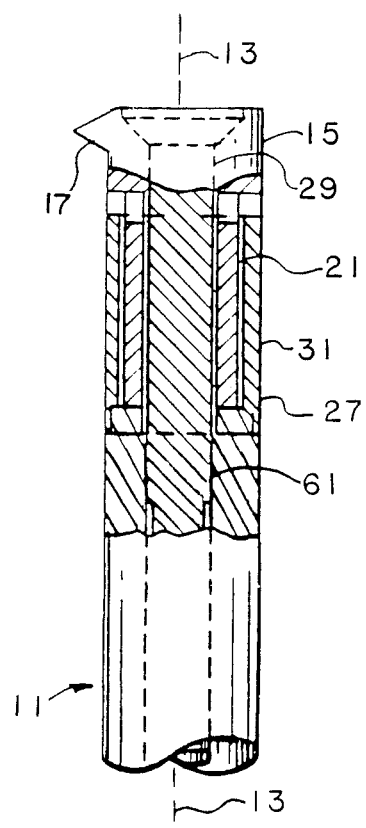
FIG. 1 is a plan view of the grooving or threading tool showing a portion in section.
Figure 1:
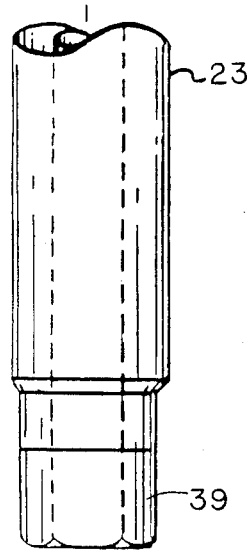

The embodiment of this invention as set forth in the drawings is particularly suited for achieving the objects of this invention. FIG. 1 depicts a cylindrically shaped grooving or threading tool having a central longitudinal axis. If the grooving or threading tool 11 is rotated so to cut the work, the longitudinal axis 13 is parallel to or coincides with the axis of rotation. In case the work is rotated, the longitudinal axis 13 is parallel to or coincides with the central axis of the part or bore being cut. A forwardly projecting cutting section 15 has a radially projecting cutting edge 17 adapted to be driven into the work being cut for grooving or threading purposes. An intermediate section 19 which is formed of a steel material is positioned between the rearward cemented carbide section 23 and the cutting section 15. The rearward section 23 is a cemented tungsten carbide body which may have a longitudinally extending flat section 25 on the outer periphery for engaging a holding mechanism for securing the grooving or threading tool 11 during a cutting operation. In the case where the workpiece is turned and the grooving or threading tool 11 remains stationary, the flat section 25 permits holding the grooving or threading tool 11 in a stationary position.

Figure 4:
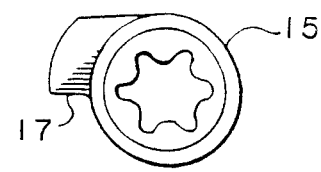
FIG. 4 is an end view of the cutting section showing FIG. 3.
Figure 3:
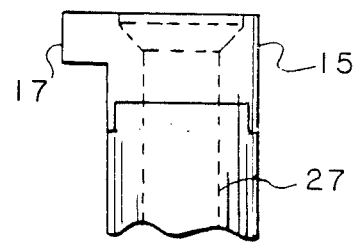
FIG. 3 is a plan view of the cutting section.
Figures 5, 6, 7:
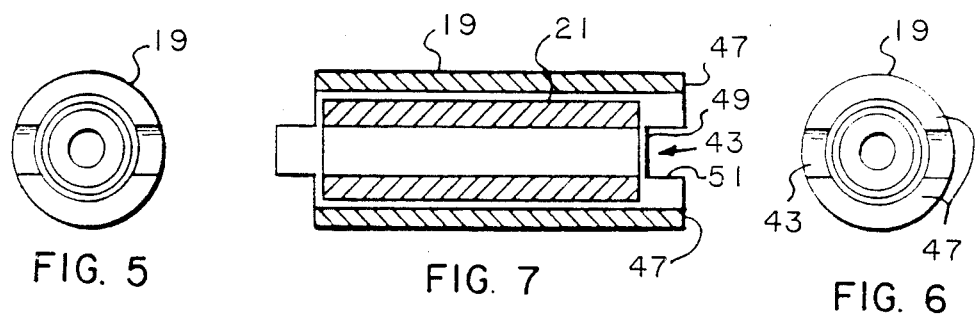
FIG. 5 is an end view of the devibrator body.
FIG. 6 is a rear view of the devibrator body.
FIG. 7 is a side elevational view of the devibrator body.

As illustrated in FIGS. 1 to 4, the configuration of the cutting section 15 is shown. The forwardly projecting cutting section 15 is preferably made of a hard cutting tool material such as cemented carbide or hardened steel. The cutting section 15 includes a radially projecting cutting edge 17 having the shape of the desired thread or groove. If a thread is being cut the cutting edge or surface 17 has a pointed configuration as shown in FIG. 1 or if a rectangular groove is being cut the cutting edge 17 has a rectangular configuration as shown in FIG. 3. The edge 17 is displaced from the longitudinal axis 13 or the peripheral surface of the generally cylindrically shaped cutting section 15 a sufficient distance to give the proper depth of cut. The area behind the cutting edge 17 blends into the cylindrically portion of the cutting section so as to strengthen the cutting surface or edge 17. As shown in FIGS. 5 and 4, the cutting section 15 includes a centrally located and axially aligned bore 29 for positioning and holding purposes.

As shown in the cross-sectional view of FIG. 1, the rearward end of the cutting section 15 is connected to a hollow cylindrically shaped intermediate section 19. The intermediate section 19 is preferably made of steel material. The interior hollow portion or opening of intermediate section 19 is a cylindrical recess having a diameter greater than the outer diameter of the devibrator 21. The devibrator 21, which is shown in more detail in FIGS. 5 to 7, is in the form of an annular ring and is positioned axially intermediate the cutting section 15 and the rearward cemented carbide section 23. The radial position of the devibrator 21 is intermediate the outer surface of the draw bar 31 and the interior surface of the intermediate section 19 which corresponds to the interior surface of the cylindrical recess or bore.

The devibrator 21 is mounted with slight axial clearance to assure freedom of radial movement. Although one annular ring is shown in the drawings as a damping device, it is contemplated that a plurality of rings may be utilized. When multiple rings are utilized, the rings may be provided with successive varying clearances between the respective outer diameters and the interior wall of the intermediate section 19. It is contemplated that various arrangements may be utilized to effectively oppose and dampen vibrations created during cutting. The devibrator 21 is preferably made of a heavy impact resistant material such as tungsten in a copper matrix or other heavy metal.

As shown in FIG. 1, the rearward end of the intermediate section 19 is connected to the cemented carbide section 23. The rearward or cemented carbide section 23 may be made by extruding a hollow cylindrical bar comprising a mixture of refractory metal carbide and metal binder material with an organic binder. The extruded bar is sintered under conditions known in the art to obtain the final cemented carbide. If the bar is solid the section 23 may also be machined by techniques known in the art to hollow out the interior. Preferably, tungsten carbide is utilized as the refractory metal carbide with cobalt the metal binder. It is contemplated that the cemented carbide will include additional refractory metal carbides, such as molybdenum carbide and other binder ingredients to enhance the desirable material properties of the rearward section. Such desirable properties include stiffness, high density, and dimensional accuracy.

It has been found that the combination of a rearward section 23 of sintered cemented carbide having a density of 0.54 lb/in$^3$ and an elastic modulus of 94 million psi and a steel cutting section and intermediate section is preferred. The interior opening 33 of the cemented carbide rearward section 23 is a cylindrical recess having an interior surface spaced a sufficient distance from the longitudinal axis 13 so that the drawbar 31 can be inserted into the interior opening 33 without interference.

Figure 2:
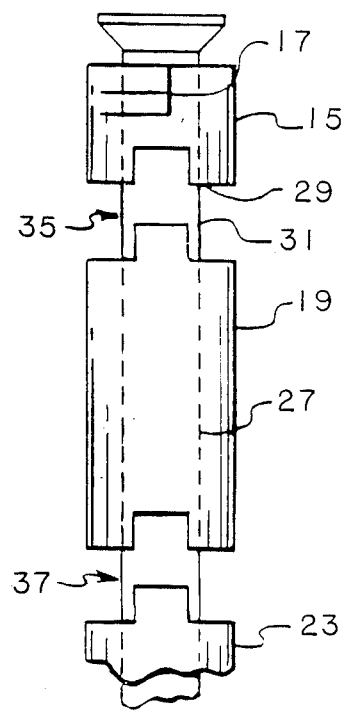
FIG. 2 is a side elevational view showing the connections between the intermediate section and the respective cutting section and cemented carbide section of FIG. 1.
Figure 9:
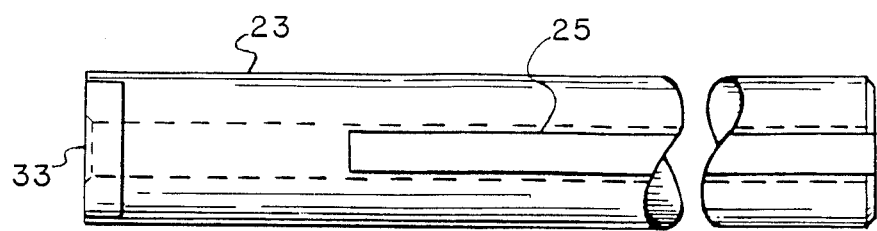
FIG. 9 is a plan view of the cemented carbide section shown in FIG. 11.

Also, in accordance with the principles of the present invention, the intermediate section 19 forms a connection 35 with the cutting section 15 and another rearward section which provides a stiff juncture between the sections 15, 19, 23 and provides minimal flexure between different materials being utilized. Referring to FIG. 2, the intermediate section 19 includes complementary mating connections 35 and 37 with the cutting section 15 and rearward section 23, respectively. The respective sections 15, 19, and 23 are held in axial alignment by the abutment of the respective end portions of each of the sections 15, 19, 23. The sections 15, 19, 23 are held in compression by a drawbar 31. The drawbar 31 has one end in engagement with the rearward section 23 the other end having a head in engagement with the cutting section 15. The drawbar 31 extends entirely through the intermediate section 19 and is preferably attached at the end of the rearward section 23 by a nut 39 secured to a threaded end of the draw bar 31.

The drawbar 31 is placed under tension by turning the nut 39 to increase tension on the drawbar 31 and place an increased compressive force on the sections 15, 19, 23. The drawbar 31, as illustrated in FIG. 2, is cylindrically shaped and threaded at one end and has a head at the other end. The diameter is less than the interior cylindrical recess so as to permit the drawbar 31 to be easily inserted into the cylindrical recess. By tightly drawing the drawbar 31 into tension, the flexure at the respective connections 35, 37 can be reduced and the stiffness of the connections enhanced.

Also in accordance with the principles of the present invention, the respective connections 35, 37 have a preferred geometrical configuration for enhancing the stiffness at the juncture of the sections 15, 19, 23. The combination of utilizing a drawbar 31 and specific configuration geometry is an important feature of the present invention.

Figure 8:
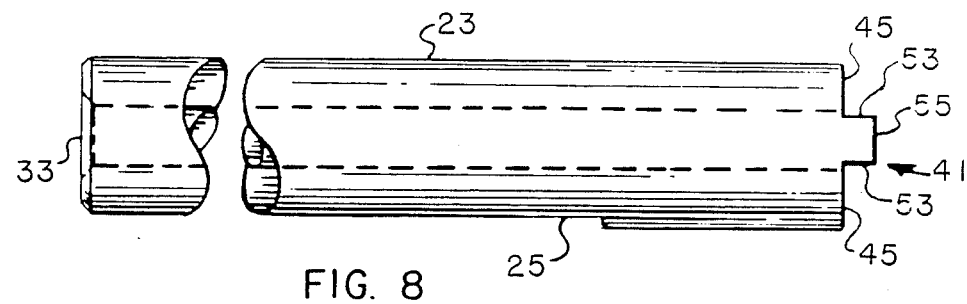
FIG. 8 is a side elevational view of the cemented carbide section.

As shown in detail in FIG. 2, the intermediate section 19 forms complimentary connections 35, 37 with each connection of the connections 35, 37 comprising a key 41 (see FIG. 7) and a keyway 43 (see FIG. 8). A pair of first surfaces 45 are associated with the key 41 and a pair of second surfaces 47 are associated with the keyway 43. The first surfaces 45 mate with the second surfaces 47 to provide for utilization of a large cross-sectional area of the respective sections 15, 19, 23 for bearing the compressive force between the sections and maintaining axial alignment. Preferably, the respective surfaces 45, 47 of the respective cutting section 15 and the cemented carbide section 23 comprise a major portion of the cross-sectional area of the respective section 25, 23. The first and second surfaces, 45 and 47, extend on either side of the respective key 41 or keyway 43 and lie substantially within a plane perpendicular to the longitudinal axis 13 of the grooving and threading tool 11.

As shown in FIG. 7, the keyway 43 comprises a transversely extending slot having a rectangular cross-section. The transverse axis of the slot is in alignment with a diameter passing through the axis of the grooving or threading tool 11. The keyway associated with the cutting section 15 at connection 35 is similarly configured. The keyway 43 has a flat bottom wall 49 with planar side walls 51 extending outwardly therefrom. Each of the respective side walls 51 join a respective one of the second surfaces 47. Each of the second surfaces 47 extend laterally outwardly from the keyway 43.

FIG. 8 shows details of the configuration of key 41. The key 41 has a configuration matching the keyway 45. Sides 53 extend diametrically across and project outwardly from the end of a respective section. The sides 53 are joined by planar top wall 55 which matches the bottom wall 49. When the key 41 is inserted into the keyway 43, the sides 53 of the key 41 are closely adjacent the sidewalls 51 of the keyway 43, so that torque from turning the grooving and threading tool 11 is transmitted from one section to the other. The close fit between the key 41 and keyway 43 aids in obtaining the proper axial alignment between respective sections 15, 19, 23. The top wall 55 of the key 41 is preferably spaced from the bottom wall 49 of the keyway 43, so that the compressive forces are borne by the first and second surfaces.

As shown in the partial sectional view of FIG. 1, the drawbar 31 has an enlarged end portion 61 closely adjacent the rearward section 23. The partial section of FIG. 1 shows the enlarged end portion 61 and its relationship with the cylindrical recess of the rearward section 23 as exaggerated to shown the details of a sliding precision fit between the drawbar 31 and the rearward section 23. The drawbar 31 is thusly provided with a means for centering the drawbar 31 relative to the rearward section 23 to prevent relative radial movement between an end of the drawbar 31 and the rearward section 23. According to a most preferred sliding precision fit, the tolerance of the inside diameter of the rearward section 33 is held at a total tolerance of less than ten ten thousandths of an inch, and preferably at a total tolerance of less than five ten thousandths of an inch. The drawbar 31 which is of a steel construction is also held to a similar total tolerance. The above description of the sliding precision fit is not intended to limit the present invention since it is believed that greater tolerances may be used for the respected exterior precision surfaces on the exterior of the drawbar 31 and the interior of the rearward section 23.

Also, according to a preferred embodiment of the present invention, the enlarged portion 61 extends rearwardly along the axial direction from the junction of the rearward section 23 a distance sufficient to impart enhanced stiffness to the tool 11. To a certain extent, the preferred rearward extent of the enlarged portion 61 depends on the diameter of the drawbar 31 and the diameter of the cylindrical recess in the rearward section 23 with larger diameters requiring a greater rearward extension of the enlarged portion 61 to result in a proportionally enhanced stiffening effect. Preferably the enlarged portion 61 extends rearwardly a distance along the axis of the drawbar 31 a distance of from about one to about four diameters. The diameter can be either the inside diameter of the cylindrical recess or the outside diameter of the drawbar 31 since both are essentially identical in the area of the sliding precision fit.

In an embodiment as shown in FIG. 2, the respective first surfaces 45 and respective second surfaces 47 comprise a major portion of the cross-sectional area of the grooving or threading tool. The connection between the cutting section 15 and cemented carbide section 23 is shown at 65. The relatively large cross-sectional area of the surfaces 45 and 47 of the respective cutting section 15 and cemented carbide section 23 are in direct mating relationship and bear the compressive force created by the drawbar. Thus, a structure of increased rigidity is provided due to the use of a drawbar and large area of the mating surfaces.

I claim:
1. An elongated grooving and threading tool of the type having a radially projecting cutting edge, said tool comprising a cutting section having an axially extending bore and a radially projecting cutting edge, a hollow cylindrically shaped cemented carbide section having a cylindrically shaped axially aligned opening.

a cylindrically shaped intermediate section having an opening extending therethrough, said intermediate section positioned intermediate said cutting section and said cemented carbide section, a first connection formed at the juncture of said intermediate section and said cutting section, a second connection formed at the juncture of said intermediate section and said cemented carbide section, said first and said second connection comprise a key and a keyway and a pair of first and second surfaces wherein each surface has a cross-sectional area, each cross-sectional area of said respective surfaces comprise about a major portion of the cross-sectional area of said respective cutting section, said intermediate section, and said carbide section, a drawbar connected between said cutting section and said cemented carbide section for holding said sections in axial alignment along said axis, said drawbar being under tension for holding said intermediate section and said first and said second connections under a compressive force, a cylindrically shaped enlarged means for centering said drawbar relative to the rearward section for preventing relative radial movement and permitting axial movement between the forward end of said drawbar and the rearward section, said cylindrically shaped enlarged means being adapted for providing a sliding precision fit between the drawbar and the rearward section within said hollow rearward section for preventing relative radial movement between the forward end of said drawbar and the rearward section, said cylindrically shaped enlarged means being at the juncture of said intermediate section and said cemented carbide section and extending rearwardly along the axial direction from the junction of the rearward section a distance sufficient to impart stiffness to said tool, and at least one annular ring for dampening vibrations positioned around said draw bar in said intermediate section and positioned axially intermediate said cutting section and said carbide section.

2. An elongated grooving or threading tool according to claim 1 wherein said enlarged portion extends rearwardly a distance of from about one to about four diameters wherein said diameter corresponds to the diameter of said enlarged portion at said sliding precision fit.

* * * * *